(12) United States Patent
Suzuki

(10) Patent No.: US 9,759,308 B2
(45) Date of Patent: Sep. 12, 2017

(54) VEHICLE DRIVING FORCE DISTRIBUTION DEVICE

(71) Applicant: JTEKT CORPORATION, Osaka-shi (JP)

(72) Inventor: Kunihiko Suzuki, Gamagori (JP)

(73) Assignee: JTEKT CORPORATION, Osaka-shi (JP)

( * ) Notice: Subject to any disclaimer, the term of this patent is extended or adjusted under 35 U.S.C. 154(b) by 238 days.

(21) Appl. No.: 14/580,476

(22) Filed: Dec. 23, 2014

(65) Prior Publication Data

US 2015/0192198 A1    Jul. 9, 2015

(30) Foreign Application Priority Data

Jan. 6, 2014 (JP) ................................ 2014-000522

(51) Int. Cl.
*F16H 57/04* (2010.01)
*F16H 48/38* (2012.01)
(Continued)

(52) U.S. Cl.
CPC ....... *F16H 57/0424* (2013.01); *B60K 17/346* (2013.01); *B60K 17/35* (2013.01);
(Continued)

(58) Field of Classification Search
CPC .. F16H 57/0424; F16H 48/38; F16H 57/0473; F16H 57/0483; B60K 17/346; B60K 17/35
(Continued)

(56) References Cited

U.S. PATENT DOCUMENTS

| 5,209,321 A | 5/1993 | Sado |
| 8,366,575 B2 * | 2/2013 | Ariga .................... F16H 57/037 123/196 R |

(Continued)

FOREIGN PATENT DOCUMENTS

| EP | 2 574 827 A1 | 4/2013 |
| EP | 2 626 229 A1 | 8/2013 |
| JP | 2013-154827 | 8/2013 |

OTHER PUBLICATIONS

Extended Search Report issued Jun. 15, 2015 in European Patent Application No. 15150010.5.

*Primary Examiner* — Joseph Rocca
*Assistant Examiner* — Michael Stabley
(74) *Attorney, Agent, or Firm* — Oblon, McClelland, Maier & Neustadt, L.L.P.

(57) ABSTRACT

A vehicle driving force distribution device includes: a differential gear; a driving force transmission device; and a case member having a first accommodating chamber accommodating the differential gear and a second accommodating chamber accommodating the driving force transmission device. The case member has a first flow passage that allows lubricating oil to flow from the first accommodating chamber into the second accommodating chamber, and a second flow passage that allows lubricating oil to flow from the second accommodating chamber into the first accommodating chamber. In a two-wheel drive mode, lubricating oil flows from the second accommodating chamber into the first accommodating chamber through the second flow passage. In a four-wheel drive mode, lubricating oil flows from the first accommodating chamber into the second accommodating chamber through the first flow passage.

6 Claims, 8 Drawing Sheets

(51) Int. Cl.
*B60K 17/346* (2006.01)
*B60K 17/35* (2006.01)

(52) U.S. Cl.
CPC ......... *F16H 48/38* (2013.01); *F16H 57/0473* (2013.01); *F16H 57/0483* (2013.01)

(58) Field of Classification Search
USPC ........................................................ 180/248
See application file for complete search history.

(56) References Cited

U.S. PATENT DOCUMENTS

| | | | |
|---|---|---|---|
| 8,428,838 B2 * | 4/2013 | Kondo | B60K 23/08 701/69 |
| 2011/0039652 A1 | 2/2011 | Ekonen et al. | |
| 2013/0178321 A1 | 7/2013 | Ekonen et al. | |
| 2013/0178323 A1 | 7/2013 | Ekonen et al. | |
| 2013/0274055 A1 | 10/2013 | Horaguchi et al. | |
| 2013/0283972 A1 * | 10/2013 | Yamamoto | B60K 6/405 74/665 B |
| 2013/0316866 A1 * | 11/2013 | Kawamura | F16H 57/027 475/160 |
| 2014/0231209 A1 | 8/2014 | Nett et al. | |
| 2014/0311268 A1 * | 10/2014 | Grosswald | F16H 57/0493 74/468 |
| 2015/0152954 A1 * | 6/2015 | Kajikawa | F16H 57/045 475/150 |

* cited by examiner

VEHICLE DRIVING FORCE DISTRIBUTION DEVICE

INCORPORATION BY REFERENCE

The disclosure of Japanese Patent Application No. 2014-000522 filed on Jan. 6, 2014 including the specification, drawings and abstract, is incorporated herein by reference in its entirety.

BACKGROUND OF THE INVENTION

1. Field of the Invention

The invention relates to vehicle driving force distribution devices that distribute a driving force received from an input shaft to first and second output shafts.

2. Description of the Related Art

Conventionally, a driving force distribution device is known which is placed on an auxiliary drive wheel-side in a driving force transmission system of a four-wheel-drive vehicle including main drive wheels to which a driving force of a driving source is constantly transmitted and auxiliary drive wheels to which the driving force of the driving source is transmitted according to the traveling state, and which distributes the driving force received from a propeller shaft to right and left wheels. See, e.g., Japanese Patent Application Publication No. 2013-154827 (JP 2013-154827 A).

In the driving force distribution device described in JP 2013-154827 A, a differential gear and a driving force interruption portion are accommodated in a differential carrier placed on a rear wheel-side of the four-wheel-drive vehicle. The differential gear includes in a differential case a differential gear mechanism formed by a pair of side gears and a pair of pinion gears. The driving force interruption portion includes a cylindrical clutch housing, an inner shaft accommodated in the clutch housing, a multi-plate clutch placed between an inner peripheral surface of the clutch housing and an outer peripheral surface of the inner shaft, and a pressing mechanism that presses the multi-plate clutch in an axial direction.

One of the pair of side gears is coupled to the right rear wheel, and the other side gear is coupled to the clutch housing of the driving force interruption portion. The left rear wheel is coupled to the inner shaft. The multi-plate clutch is formed by alternately arranging a plurality of outer clutch plates and a plurality of inner clutch plates in the axial direction. The plurality of outer clutch plates are engaged with the clutch housing so as not to be rotatable relative to the clutch housing. The plurality of inner clutch plates are engaged with the inner shaft so as not to be rotatable relative to the inner shaft. Lubricating oil is present between the outer and inner clutch plates in order to reduce abrasion and achieve smooth frictional sliding. When the multi-plate clutch is pressed by the pressing mechanism, the clutch housing is coupled to the inner shaft, and a driving force is transmitted to the right and left rear wheels.

In the four-wheel-drive vehicle described in JP 2013-154827 A, a dog clutch is placed on a front wheel-side of the propeller shaft. When the four-wheel-drive vehicle travels in a four-wheel drive mode, the dog clutch is coupled, so that a driving force of the driving source is transmitted to the propeller shaft and is transmitted from the propeller shaft to the right and left rear wheels via the differential gear and the multi-plate clutch of the driving force interruption portion which are located on the rear wheel side.

On the other hand, when the four-wheel-drive vehicle travels in a two-wheel drive mode, the dog clutch is decoupled, and the multi-plate clutch of the driving force interruption portion is disengaged, so that transmission of the driving force to the right and left rear wheels is stopped. In this case, transmission of the driving force from the driving source to the propeller shaft is cut off by the dog clutch, and transmission of a rotational force from the right and left rear wheels to the propeller shaft is also stopped. Rotation of the propeller shaft is therefore stopped even if the four-wheel-drive vehicle is traveling. Rotation of the differential case is also stopped accordingly. This reduces stirring resistance of the lubricating oil by gears of each part which is associated with the rotation of the propeller shaft and the differential case, and fuel economy of the four-wheel-drive vehicle can be improved.

According to the four-wheel-drive vehicle described in JP 2013-154827 A, the clutch housing and the inner shaft of the driving force interruption portion rotate in the opposite directions when the four-wheel-drive vehicle travels in the two-wheel drive mode. That is, one of the pair of side gears in the differential gear which is coupled to the right rear wheel rotates together with the right rear wheel, and the other side gear rotates in the opposite direction to the one side gear by rotation of the pinion gears. The inner shaft coupled to the rear left wheel rotates in the same direction as the one side gear coupled to the right rear wheel. The clutch housing and the inner shaft of the driving force interruption portion thus rotate in the opposite directions.

As the clutch housing and the inner shaft rotate in the opposite directions, drag torque is generated between the plurality of outer clutch plates and the plurality of inner clutch plates of the multi-plate clutch by viscosity of the lubricating oil. That is, when the four-wheel-drive vehicle travels in the two-wheel drive mode, this drag torque between the clutch plates serves as travel resistance, thereby causing power loss. The driving force distribution device described in JP 2013-154827 A has still room for improvement in this regard.

SUMMARY OF THE INVENTION

It is one object of the invention to provide a vehicle driving force distribution device capable of reducing drag torque in a clutch when a four-wheel-drive vehicle travels in a two-wheel drive mode, and thus improving fuel economy.

A vehicle driving force distribution device according to an aspect of the invention includes: a differential gear that distributes a driving force received from an input shaft to a first output shaft and an intermediate shaft so as to allow differential motion therebetween; a driving force transmission device having a function to adjust the driving force that is transmitted from the intermediate shaft to a second output shaft; and a case member including a first accommodating chamber accommodating the differential gear, and a second accommodating chamber accommodating the driving force transmission device. The case member has a first flow passage that allows lubricating oil to flow from the first accommodating chamber into the second accommodating chamber, and a second flow passage that allows lubricating oil to flow from the second accommodating chamber into the first accommodating chamber. When the input shaft does not rotate and the intermediate shaft and the second output shaft rotate in opposite directions, lubricating oil flows from the second accommodating chamber into the first accommodating chamber through the second flow passage. When the input shaft rotates and the intermediate shaft and the second output shaft rotate in a same direction, lubricating oil flows from the first accommodating chamber into the second accommodating chamber through the first flow passage.

The vehicle driving force distribution device of the above aspect can reduce drag torque in a clutch in a two-wheel drive mode of a four-wheel-drive vehicle and improving fuel economy.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the invention will be described with reference to the accompanying drawings.

Figure 1:
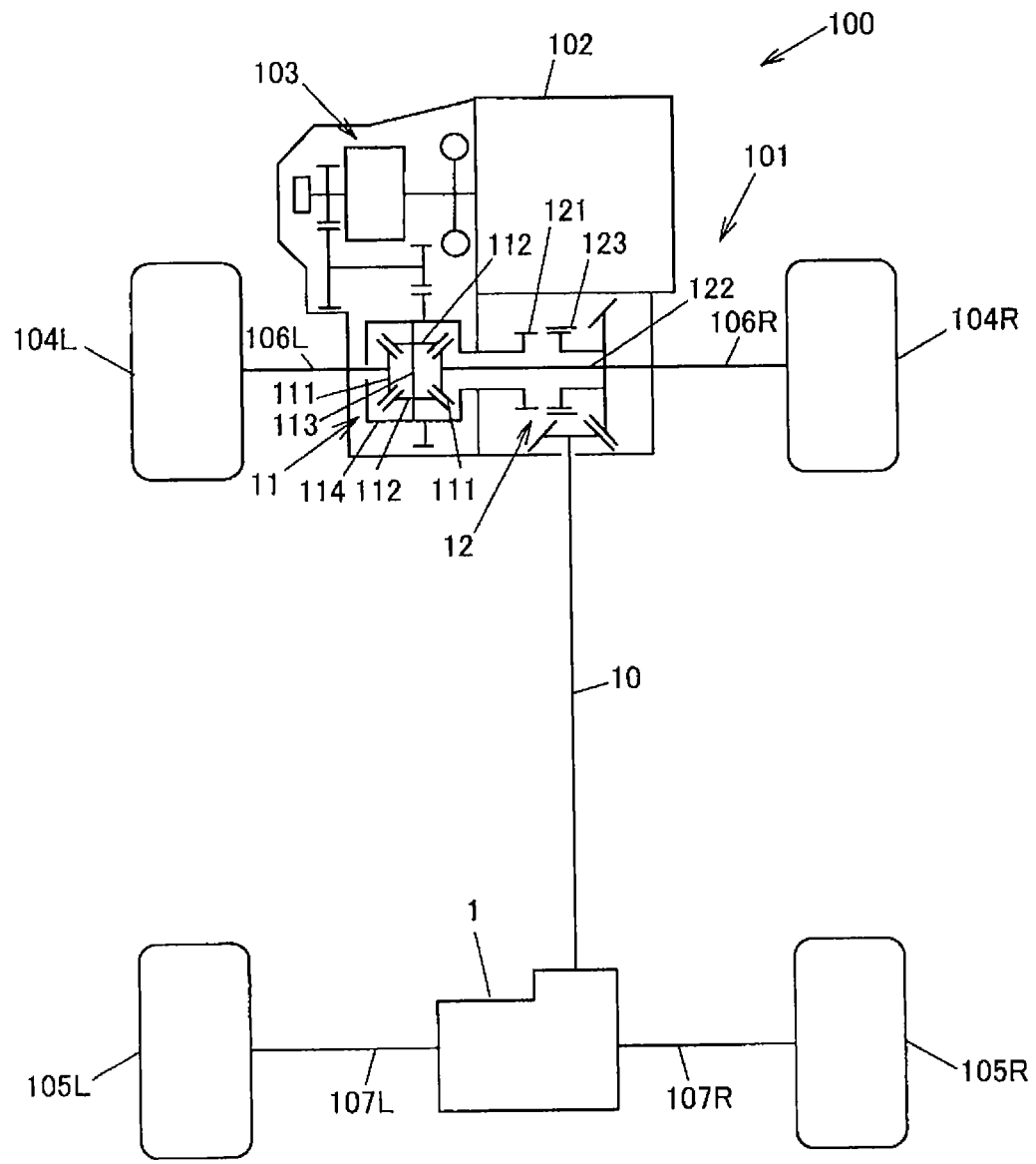
FIG. 1 is a schematic diagram showing a configuration example of a four-wheel-drive vehicle having mounted thereon a vehicle driving force distribution device according to an embodiment of the invention.

FIG. 1 is a schematic diagram showing a configuration example of a four-wheel-drive vehicle having mounted thereon a vehicle driving force distribution device according to an embodiment of the invention.

A four-wheel-drive vehicle 100 includes an engine 102 as a driving source, a transmission 103, a pair of front wheels 104L, 104R as main drive wheels, a pair of rear wheels 105L, 105R as auxiliary drive wheels, and a driving force transmission system 101 that transmits torque of the engine 102 to the pair of front wheels 104L, 104R and the pair of rear wheels 105L, 105R.

The driving force transmission system 101 has a front differential 11, a dog clutch 12 as an engagement/disengagement mechanism capable of cutting off transmission of a driving force, a propeller shaft 10, a driving force distribution device 1, front drive shafts 106L, 106R, and rear drive shafts 107L, 107R. The driving force transmission system 101 transmits a driving force of the engine 102 to the front wheels 104L, 104R and the rear wheels 105L, 105R. The driving force of the engine 102 is constantly transmitted to the front wheels 104L, 104R. The driving force of the engine 102 is transmitted to the rear wheels 105L, 105R via the dog clutch 12 and the propeller shaft 10.

The front differential 11 has a pair of side gears 111 coupled to the pair of front drive shafts 106L, 106R, a pair of pinion gears 112 meshing with the pair of side gears 111 such that the gear axes of the pinion gears 112 extend perpendicularly to those of the side gears 111, a pinion gear support member 113 supporting the pair of pinion gears 112, and a front differential case 114 accommodating the pair of side gears 111, the pair of pinion gears 112, and the pinion gear support member 113.

The dog clutch 12 has a first rotating member 121 that rotates together with the front differential case 114, a second rotating member 122 that is coaxial with the first rotating member 121 and is rotatable relative to the first rotating member 121, and a sleeve 123 that has a function to couple the first rotating member 121 and the second rotating member 122 so that the first and second rotating members 121, 122 are not rotatable relative to each other. Specifically, outer peripheral spline fitting portions provided on the outer peripheral surfaces of the first and second rotating members 121, 122 mesh with an inner peripheral spline fitting portion provided on the inner peripheral surface of the sleeve 123, whereby the first rotating member 121 and the second rotating member 122 are coupled by the sleeve 123 so as to rotate together. In the case where the sleeve 123 is moved in the axial direction so as to mesh with only the outer peripheral spline fitting portion of the second rotating member 122 and not to mesh with the outer peripheral spline fitting portion of the first rotating member 121, the first rotating member 121 and the second rotating member 122 are decoupled from each other and are rotatable relative to each other. The sleeve 123 can be moved forward and rearward in the axial direction by an actuator, not shown.

The propeller shaft 10 receives torque of the engine 102 from the front differential case 114 via the dog clutch 12, and transmits the torque to the driving force distribution device 1. A gear mechanism 13 is placed on the end on the front wheel side of the propeller shaft 10. The gear mechanism 13 is formed by a pinion gear 10a provided on the propeller shaft 10 and a ring gear 10b meshing with the pinion gear 10a. The ring gear 10b is coupled to the second rotating member 122 of the dog clutch 12 so as not to be rotatable relative to the second rotating member 122.

The engine 102 outputs a driving force to the pair of front drive shafts 106L, 106R via the transmission 103 and the front differential 11 to drive the pair of front wheels 104L, 104R. The engine 102 outputs a driving force to the pair of rear drive shafts 107L, 107R via the transmission 103, the dog clutch 12, the propeller shaft 10, and the driving force distribution device 1 to drive the pair of rear wheels 105L, 105R.

The driving force distribution device 1 distributes the driving force received from the propeller shaft 10 as an input shaft to the rear drive shafts 107L, 107R as first and second output shafts so as to allow differential motion therebetween. The rear drive shaft 107L is coupled to the left rear wheel 105L, and the rear drive shaft 107R is coupled to the right rear shaft 105R.

The configuration of the driving force distribution device 1 will be described in detail below.

Figure 2:
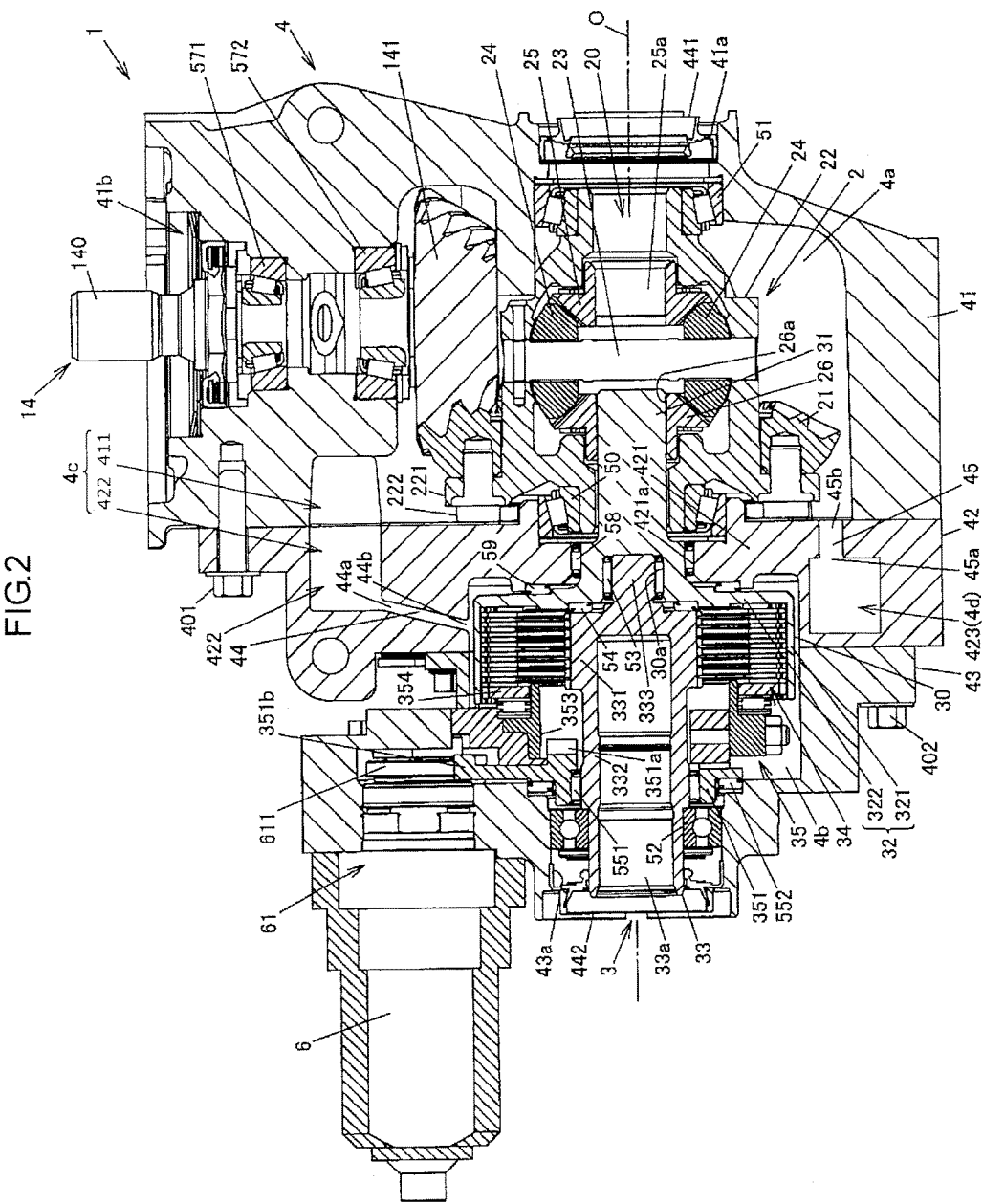
FIG. 2 is a sectional view showing the driving force distribution device.
Figure 3:
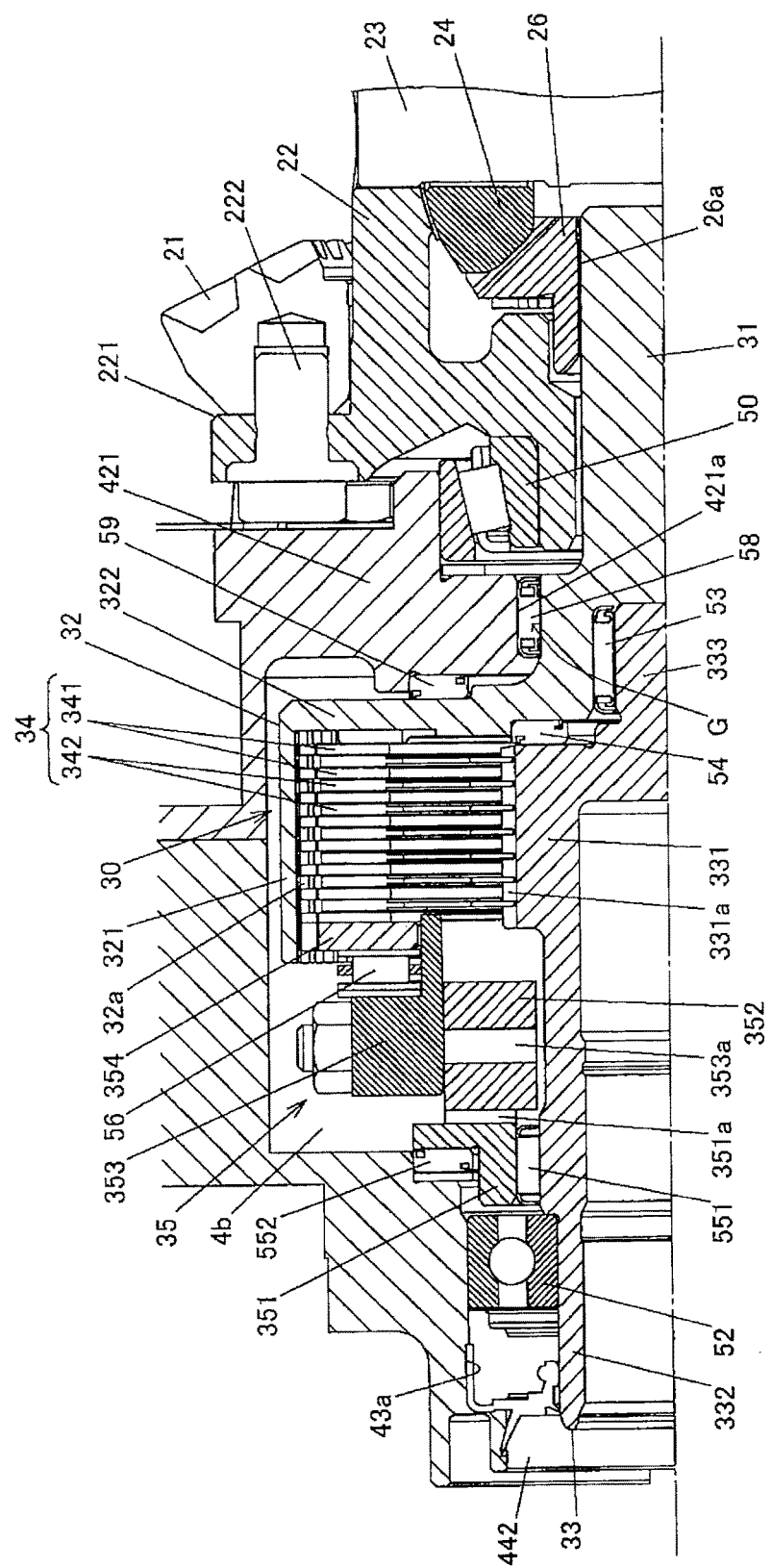
FIG. 3 is a partial enlarged view of FIG. 2.

FIG. 2 is a sectional view showing the driving force distribution device 1. FIG. 3 is a partial enlarged view of FIG. 2.

The driving force distribution device 1 includes a differential gear 2, a driving force transmission device 3, and a case member 4. The differential gear 2 distributes a driving force received from the propeller shaft 10 to the rear drive shafts 107L, 107R and an intermediate shaft 31. The driving force transmission device 3 has a function to adjust the driving force that is transmitted from the intermediate shaft 31 to the rear drive shaft 107L. The case member 4 has a first accommodating chamber 4a accommodating the differential gear 2, and a second accommodating chamber 4b accommodating the driving force transmission device 3. The first and second accommodating chambers 4a, 4b contain lubricating oil. This lubricating oil is differential oil having viscosity suitable for lubrication of gears.

The differential gear 2 has a differential case 22 having a ring gear 21 placed around its outer periphery, and a differential gear mechanism 20 accommodated in the differential case 22. The differential case 22 has a flange 221 formed on its outer periphery, and the ring gear 21 is attached to the flange 221 by a plurality of bolts 222. A pinion gear shaft 14 is provided so as to rotate with the propeller shaft 10, and a gear portion 141 of the pinion gear shaft 14 meshes with the ring gear 21. The differential case 22 is rotatably supported in the first accommodating chamber 4a of the case member 4 by tapered roller bearings 50, 51.

The differential gear mechanism 20 is formed by a pinion shaft 23 supported by the differential case 22, a pair of pinion gears 24 rotatably supported by the pinion shaft 23, and first and second side gears 25, 26 meshing with the pair of pinion gears 24. The first side gear 25 has a coupling hole 25a formed in its center, and the rear drive shaft 107R is coupled to the coupling hole 25a by spline fitting. The second side gear 26 has a coupling hole 26a formed in its center, and the intermediate shaft 31 provided integrally with a clutch drum 32 of the driving force transmission device 3 described below is coupled to the coupling hole 26a by spline fitting.

The driving force transmission device 3 has the shaft-shaped intermediate shaft 31, the cylindrical clutch drum 32, an inner shaft 33, a friction clutch 34, and a pressing mechanism 35. The clutch drum 32 rotates together with the intermediate shaft 31. The inner shaft 33 has it one end accommodated in the clutch drum 32, and the rear drive shaft 107L is coupled to the inner shaft 33 so as not to be rotatable relative to the inner shaft 33. The friction clutch 34 is placed between the clutch drum 32 and the inner shaft 33, and couples the clutch drum 32 and the inner shaft 33 so that toque can be transmitted therebetween. The pressing mechanism 35 applies an axial pressing force to the friction clutch 34. The pressing mechanism 35 is operated by an electric motor 6 fixed to the outside of the case member 4.

In the present embodiment, the intermediate shaft 31 is integral with the clutch drum 32, and the intermediate shaft 31 and the clutch drum 32 are formed as a part of a clutch housing 30. The clutch housing 30 is placed to extend in the first accommodating chamber 4a and the second accommodating chamber 4b of the case member 4. The intermediate shaft 31 is formed at an axial end located closer to the differential gear 2 of the clutch housing 30, and the clutch drum 32 is formed at an axial end located closer to the inner shaft 33 of the clutch housing 30. The clutch drum 32 has a bottomed cylindrical shape having a cylindrical portion 321 and a bottom portion 322, and the intermediate shaft 31 extends in the axial direction from the central portion of the bottom portion 322. The clutch drum 32 thus rotates together with the intermediate shaft 31.

The inner shaft 33 has a cylindrical shape having a coupling hole 33a formed in its center, and the rear drive shaft 107L is coupled to the coupling hole 33a by spline fitting. The inner shaft 33 integrally has a large diameter portion 331 accommodated in the clutch drum 32, a small diameter portion 332 provided on the opening side of the coupling hole 33a with respect to the large diameter portion 331, and a boss portion 333 provided on the opposite end of the large diameter portion 331 from the small diameter portion 332. The small diameter portion 332 of the inner shaft 33 is supported by a ball bearing 52 placed between the small diameter portion 332 and the case member 4, and the boss portion 333 of the inner shaft 33 is rotatably supported by a needle roller bearing 53 placed between the boss portion 333 and the inner surface of a recess 30a formed in the clutch housing 30. A needle thrust roller bearing 54 is placed between the large diameter portion 331 and the bottom portion 322 of the clutch housing 30.

The inner shaft 33, the clutch housing 30, and the differential case 22 rotate about a common rotation axis O.

As shown in FIG. 3, the friction clutch 34 is formed by a plurality of outer clutch plates 341 and a plurality of inner clutch plates 342, and the plurality of outer clutch plates 341 and the plurality of inner clutch plates 342 are arranged alternately. The plurality of outer clutch plates 341 are coupled to the clutch drum 32 so as to be rotatable relative to the clutch drum 32 and to be movable in the axial direction. The plurality of inner clutch plates 342 are coupled to the inner shaft 33 so as to be rotatable relative to the inner shaft 33 and to be movable in the axial direction. The outer peripheral portions of the outer clutch plates 341 are engaged with a spline engagement portion 32a formed in the inner surface of the cylindrical portion 321 of the clutch drum 32. The inner peripheral portions of the inner clutch plates 342 are engaged with a spline engagement portion 331a formed in the outer periphery of the large diameter portion 331 of the inner shaft 33. When the friction clutch 34 is pressed in the axial direction, the plurality of outer clutch plates 341 frictionally contact the plurality of inner clutch plates 342, and the clutch drum 32 is coupled to the inner shaft 33 by the friction force, so that torque can be transmitted therebetween.

The pressing mechanism 35 includes a cam member 351, a rolling element 352, an annular retainer 353, and an annular pressing member 354. The cam member 351 rotates in response to rotation of an output shaft of the electric motor 6 which has been reduced in speed by a speed reducer 61. The rolling element 352 rolls on a cam surface 351a formed in the cam member 351, and the retainer 353 supports the rolling element 352. The pressing member 354 presses the friction clutch 34. The pressing member 354 is engaged with the spline engagement portion 32a of the clutch drum 32, and is coupled to the clutch drum 32 so as not to be rotatable relative to the clutch drum 32.

As shown in FIG. 2, a portion in the circumferential direction of the cam member 351 protrudes outward, and a gear portion 351b is formed on the outer peripheral surface of the protruding portion. The cam member 351 receives a rotational force from an output gear 611 of the speed reducer 61 meshing with the gear portion 351b, and rotates about the rotation axis O within a predetermined angle range. A needle roller bearing 551 is placed between the inner peripheral surface of the cam member 351 and the small diameter portion 332 of the inner shaft 33. A needle thrust roller bearing 552 is placed between an end face of the cam member 351, which extends in an axial direction, and the inner surface of a third case member 43. The cam surface 351a of the cam member 351 is tilted with respect to the circumferential direction (rotation direction) of the cam member 351.

The rolling element 352 has a cylindrical shape, and is supported by a support shaft 353a (shown in FIG. 3) fixed to the retainer 353. When the cam member 351 is rotated, the rolling element 352 rolls on the cam surface 351a, and the retainer 353 moves toward the friction clutch 34. A needle thrust roller bearing 56 is placed between the retainer 353 and the pressing member 354. The retainer 353 is subjected to an axial moving force by the rolling of the rolling element 352, and this axial moving force is transmitted to the pressing member 354 via the needle thrust roller bearing 56 as a pressing force that presses the friction clutch 34. The pressing member 354 contacts one of the plurality of outer clutch plates 341 which is located at the opposite end of the clutch drum 32 from the bottom portion 322, and presses the friction clutch 34 toward the bottom portion 322.

A friction force is thus generated between the outer and inner clutch plates 341, 342, and a driving force according to output torque of the electric motor 6 is transmitted from the clutch drum 32 to the inner shaft 33. That is, the driving force that is distributed to the left rear wheel 105L via the rear drive shaft 107L can be adjusted by increasing or decreasing a current to be supplied to the electric motor 6. Based on the operating principle of the differential gear mechanism 20, the same driving force as that to be distributed to the left rear wheel 105L is distributed to the right rear wheel 105R. The driving force distribution device 1 can distribute an appropriate driving force according to the traveling state of the vehicle to the rear wheels 105L, 105R by increasing or decreasing a current to be supplied to the electric motor 6 based on, e.g., the rotational speed difference between the front and rear wheels, the amount by which the driver steps on an accelerator pedal, the vehicle speed, the steering angle, etc.

The case member 4 has a first case member 41 mainly accommodating the differential gear 2, a second case member 42 mainly accommodating the clutch drum 32, and the third case member 43 mainly accommodating the pressing mechanism 35. The first case member 41 and the second case member 42 are fixed together by a plurality of bolts 401 (only one bolt 401 is shown in FIG. 2), and the second case member 42 and the third case member 43 are fixed together by a plurality of bolts 402 (only one bolt 402 is shown in FIG. 2).

The first case member 41 has a shaft insertion hole 41a through which the rear drive shaft 107R is inserted. The third case member 43 has a shaft insertion hole 43a through which the rear drive shaft 107L is inserted. Seal members 441, 442 are placed on the inner surfaces defining the shaft insertion holes 41a, 43a, respectively. The first case member 41 has an insertion hole 41b through which a shaft portion 140 of the pinion gear shaft 14 is inserted. The shaft portion 140 of the pinion gear shaft 14 is rotatably supported by a pair of tapered roller bearings 571, 572 placed in the insertion hole 41b.

The first accommodating chamber 4a is formed by the combination of the first case member 41 and the second case member 42. The second accommodating chamber 4b is formed by the combination of the second case member 42 and the third case member 43. The first accommodating chamber 4a and the second accommodating chamber 4b are separated from each other by a wall portion 421 formed in the second case member 42. The wall portion 421 is placed between the clutch drum 32 and the differential case 22, and has in its center an insertion hole 421a through which the intermediate shaft 31 is inserted. A needle roller bearing 58 is placed between the inner surface defining the insertion hole 421a and the intermediate shaft 31. A thrust roller bearing 59 is placed between the wall portion 421 and the bottom portion 322 of the clutch drum 32.

When the four-wheel-drive vehicle 100 configured as described above is in a four-wheel drive mode in which a driving force of the engine 102 is transmitted to the front wheels 104L, 104R and the rear wheels 105L, 105R, the dog clutch 12 is coupled and the friction clutch 34 of the driving force transmission device 3 is pressed so that torque can be transmitted. The driving force of the engine 102 is thus transmitted to the front drive shafts 106L, 106R via the front differential 11, and is transmitted to the rear drive shafts 107L, 107R via the front differential case 114, the dog clutch 12, the propeller shaft 10, and the driving force distribution device 1.

On the other hand, when the four-wheel-drive vehicle 100 is in a two-wheel drive mode in which a driving force of the engine 102 is transmitted only to the front wheels 104L, 104R, the dog clutch 12 is decoupled, and the friction clutch 34 of the driving force transmission device 3 is released (not pressed by the pressing mechanism 35). The propeller shaft 10, the pinion gear 10a and the ring gear 10b of the gear mechanism 13, the pinion gear shaft 14, the ring gear 21, and the differential case 22 are therefore not rotated during traveling in the two-wheel drive mode, whereby stirring resistance of the lubricating oil and sliding resistance of each part are reduced, and fuel economy of the four-wheel-drive vehicle 100 can be improved.

During traveling in the two-wheel drive mode, however, the first side gear 25 of the differential gear mechanism 20 rotates with the rear drive shaft 107R, and the second side gear 26 rotates in the opposite direction to the first side gear 25 due to rotation of the pinion gear 24 (rotation about the rotation center of the pinion shaft 23) associated with the rotation of the first side gear 25. The clutch housing 30 coupled to the second side gear 26 and the inner shaft 33 coupled to the rear drive shaft 107L thus rotate in the opposite directions, and the outer clutch plates 341 and the inner clutch plates 342 of the friction clutch 34 rotate in the opposite directions accordingly.

Therefore, if drag torque due to viscosity of the lubricating oil that is present between the outer and inner clutch plates 341, 342 increases, the effect of stopping rotation of the propeller shaft 10 etc. during traveling in the two-wheel drive mode is not sufficiently produced, which may reduce the effect of improving fuel economy. Accordingly, in the driving force distribution device 1 of the present embodiment, the amount of lubricating oil that is present between the outer and inner clutch plates 341, 342 is reduced during traveling in the two-wheel drive mode so as to reduce drag torque in the friction clutch 34. This configuration will be described in detail below.

Flow passages for the lubricating oil in the case member 4 are configured as follows.

The case member 4 has a first flow passage 44 that allows the lubricating oil to flow from the first accommodating chamber 4a into the second accommodating chamber 4b, and a second flow passage 45 that allows the lubricating oil to flow from the second accommodating chamber 4b to the first accommodating chamber 4a. For clarification of description, FIG. 2 shows the first flow passage 44 and the second flow passage 45 in a section of the second case member 42 of the case member 4, which is tilted with respect to the horizontal direction in the state where the driving force distribution device 1 is mounted on the four-wheel-drive vehicle 100.

In the case member 4, the lubricating oil flows from the second accommodating chamber 4b to the first accommodating chamber 4a through the second flow passage 45 when the propeller shaft 10 does not rotate and the intermediate shaft 31 and the rear drive shaft 107L rotate in the opposite directions. The lubricating oil flows from the first accommodating chamber 4a into the second accommodating chamber 4b through the first flow passage 44 when the propeller shaft 10 rotates and the intermediate shaft 31 and the rear drive shaft 107L rotate in the same direction.

Figure 4:
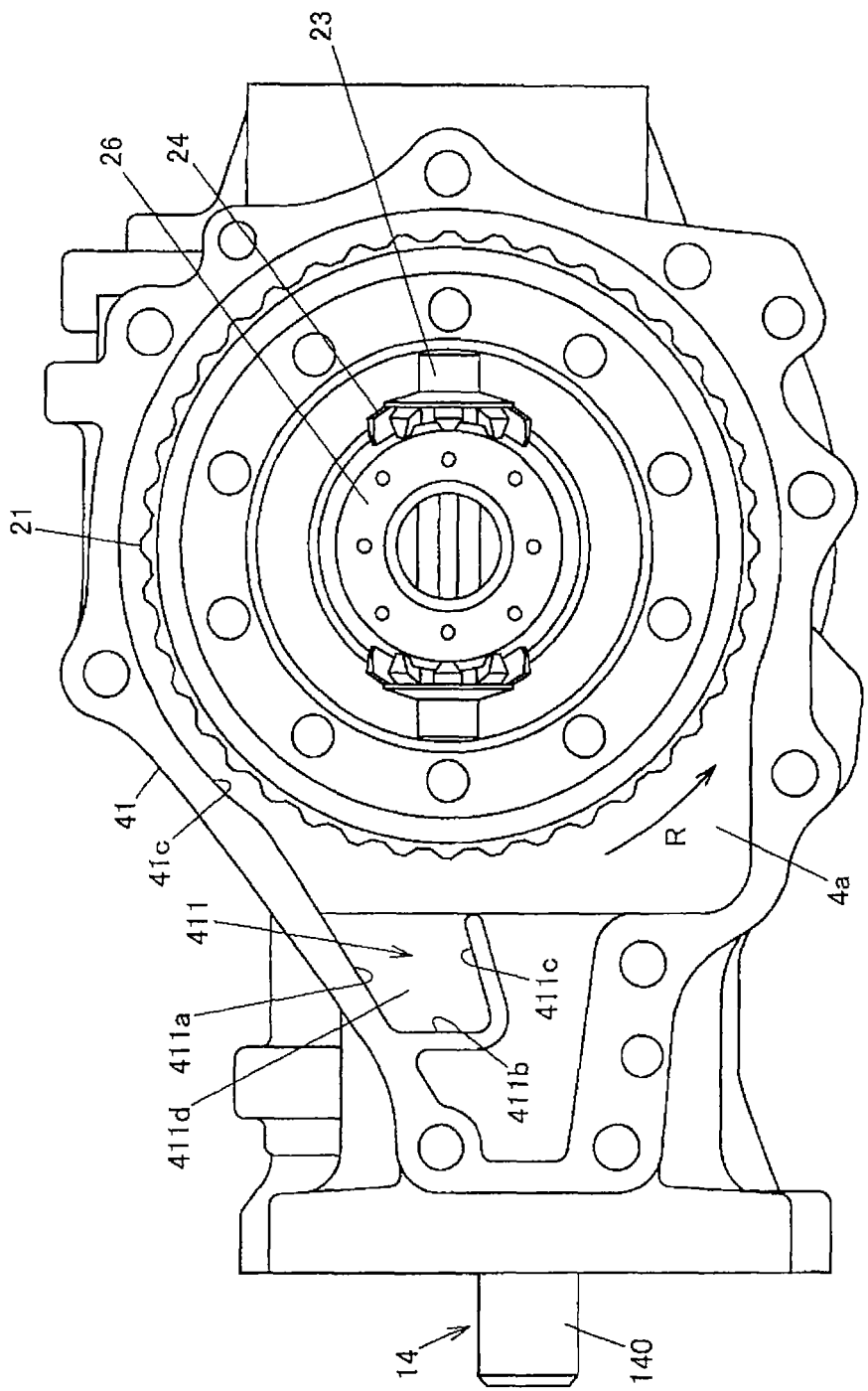
FIG. 4 is an overall view of a first case member accommodating a differential gear as viewed from the second case member side.
Figure 5:
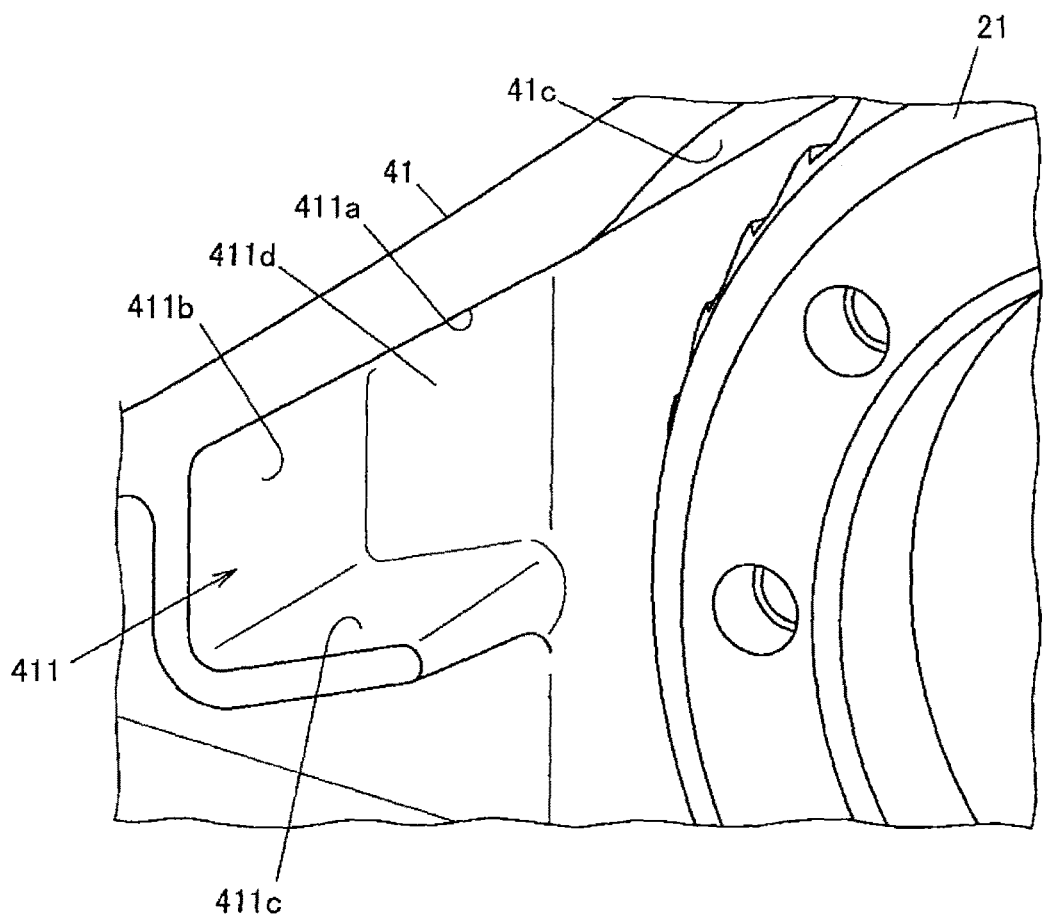
FIG. 5 is a partial enlarged perspective view of the first case member.

FIG. 4 is an overall view of the first case member 41 accommodating the differential gear 2 as viewed from the side of the second case member 42. The differential case 22 is not shown in FIG. 4. FIG. 5 is a partial enlarged perspective view of the first case member 41. In FIG. 4, the ring gear 21 rotates counterclockwise (in the direction shown by arrow R) when the four-wheel-drive vehicle 100 travels forward in the four-wheel drive mode. The lower side in FIGS. 4 and 5 corresponds to the lower side in the vertical direction in the state where the driving force distribution device 1 is mounted on the four-wheel-drive vehicle 100. Hereinafter, the terms "upper" and "lower" refers to the upper side and the lower side in the vertical direction in the state where the driving force distribution device 1 is mounted on the four-wheel-drive vehicle 100.

The first case member 41 has a first cavity 411 formed as a collecting space for collecting the lubricating oil thrown up by rotation of the ring gear 21 and the differential case 22 of the differential gear 2. The first cavity 411 is formed in the first accommodating chamber 4a so as to protrude outward of the ring gear 21 and forward (toward the front side) of the four-wheel-drive vehicle 100. The inner surface of the first cavity 411 is formed by an upper surface 411a, a bottom surface 411b, a lower surface 411c, and a side surface 411d. The upper surface 411a and the lower surface 411c are tilted downward as they get closer to the bottom surface 411b. The first cavity 411 thus opens obliquely upward as viewed from the bottom surface 411b.

The lubricating oil thrown up by rotation of the ring gear 21 flows into the first cavity 411 along a cylindrical inner surface 41c facing the ring gear 21 and the upper surface 411a. The lubricating oil scattered from the ring gear 21 directly flies into the first cavity 411. The lubricating oil thus collected in the first cavity 411 gathers on the bottom (on the side of the bottom surface 411b) of the first cavity 411 as the upper surface 411a and the lower surface 411c are tilted.

Figure 6A:
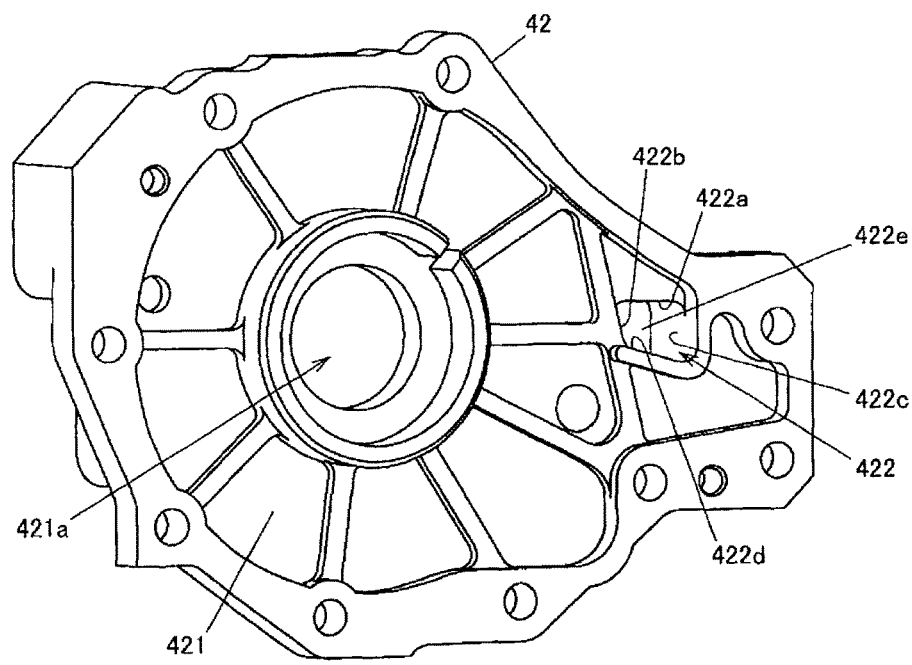
FIG. 6A is a perspective view showing the entire second case member as viewed from the first case member side.
Figure 6B:
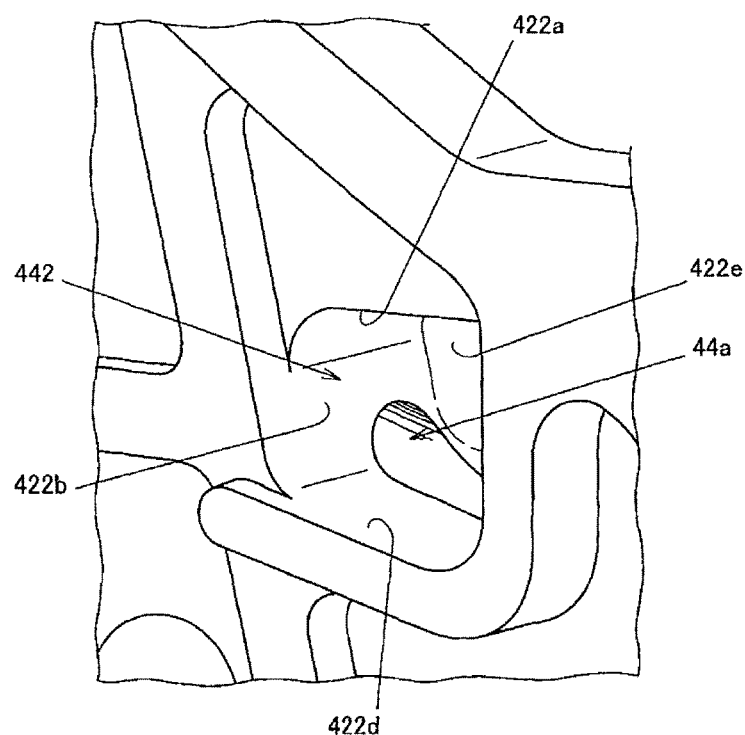
FIG. 6B is a perspective view showing a part of the second case member as viewed from a different angle from FIG. 6A.

FIG. 6A is a perspective view showing the entire second case member 42 as viewed from the side of the first case member 41. FIG. 6B is a perspective view showing a part of the second case member 42 as viewed from a different angle from FIG. 6A.

The second case member 42 has a second cavity 422 communicating with the first cavity 411 of the first case member 41. The second cavity 422 is recessed in a direction parallel to the rotation axis O from the end face of the second case member 42, which is located closer to the first case member 41. In the present embodiment, the opening of the second cavity 422 is substantially rectangular as viewed from the side of the first case member 41. The inner surface of the second cavity 422 is formed by an upper surface 422a, a pair of side surfaces 422b, 422c, a lower surface 422d, and a bottom surface 422e.

The pair of side surfaces 422b, 422c face each other in the direction perpendicular to the rotation axis O. As shown in FIG. 6B, an inlet opening 44a of the first flow passage 44 is formed in the corner between the lower surface 422d and one of the pair of side surfaces 422b, 422c, which is located closer to the rotation axis O, namely the side surface 422b. The lubricating oil collected by the first cavity 411 thus flows into the second cavity 422, and flows into the first flow passage 44 through the inlet opening 44a formed in the inner surface of the second cavity 422.

The first cavity 411 and the second cavity 422 form a first catch tank 4c that is provided in the first accommodating chamber 4a of the case member 4 so as to communicate with the first flow passage 44, and that collects the lubricating oil in the first accommodating chamber 4a. The first catch tank 4c opens in the direction in which the lubricating oil is scattered as the ring gear 21 and the differential case 22 rotate in the direction shown by arrow R. The opening area of the first catch tank 4c is larger than the flow passage area of the first flow passage 44. The lubricating oil thrown up by the rotation of the ring gear 21 and the differential case 22 is thus efficiently collected by the first catch tank 4c and supplied to the second accommodating chamber 4b through the first flow passage 44.

Figure 7:
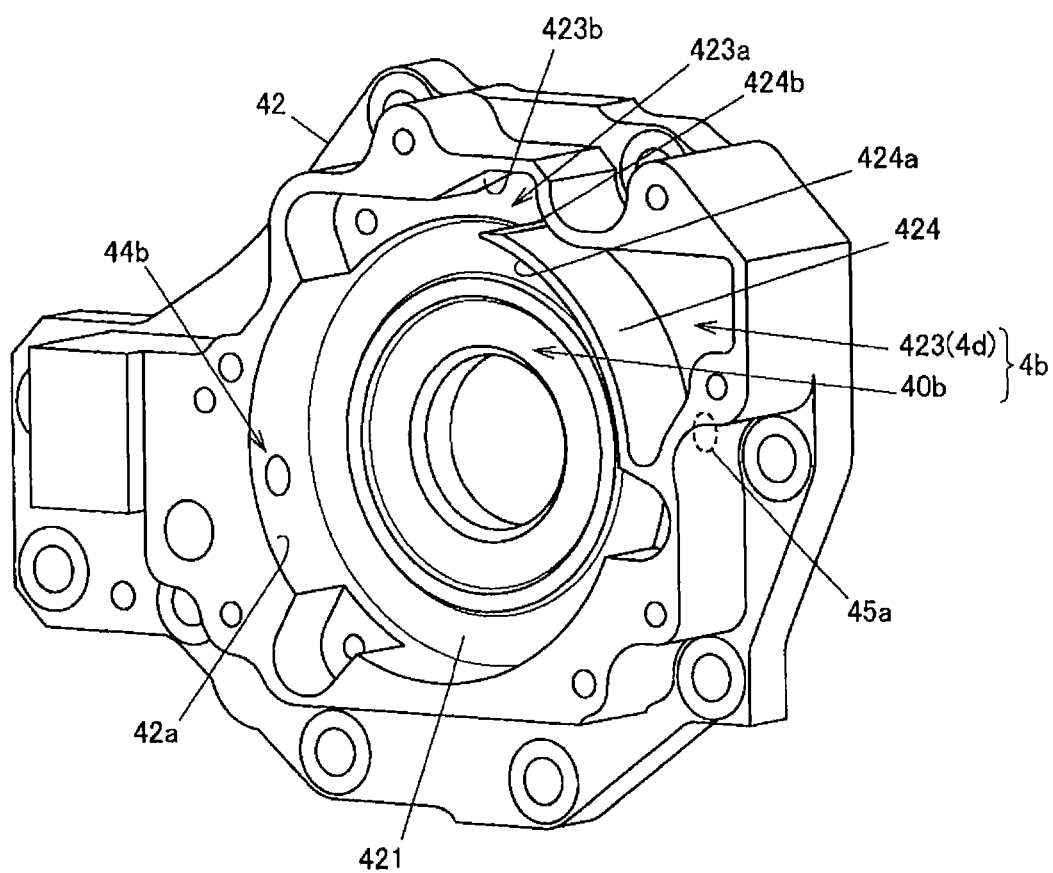
FIG. 7 is a perspective view showing the second case member as viewed from the third case member side.

FIG. 7 is a perspective view showing the entire second case member 42 as viewed from the side of the third case member 43 (the opposite side from FIG. 6A).

The second case member 42 has a discharge opening 44b of the first flow passage 44, which is formed in a part of a cylindrical inner surface 42a facing the outer peripheral surface of the clutch drum 32. That is, the discharge opening 44b of the first flow passage 44 opens to the second accommodating chamber 4b accommodating the driving force transmission device 3. The discharge opening 44b is formed at a position lower than the inlet opening 44a, so that the lubricating oil entering the first flow passage 44 through the inlet opening 44a flows through the first flow passage 44 due to its own weight and is supplied to the second accommodating chamber 4b through the discharge opening 44b. The first flow passage 44 thus allows the lubricating oil thrown up by the rotation of the ring gear 21 and the differential case 22 to flow from the first accommodating chamber 4a into the second accommodating chamber 4b.

The lubricating oil supplied to the second accommodating chamber 4b through the first flow passage 44 flows into the clutch drum 32 through an opening (in the opposite end from the bottom portion 322) of the clutch drum 32, and lubricates the outer and inner clutch plates 341, 342 of the friction clutch 34 which frictionally slide against each other. This suppresses abrasion of the outer clutch plates 341 and the inner clutch plates 342. When the propeller shaft 10 does not rotate, the ring gear 21 and the differential case 22 do not rotate. No lubricating oil in the first accommodating chamber 4a is thrown up, and supply of the lubricating oil to the second accommodating chamber 4b through the first flow passage 44 is cut off.

As shown in FIG. 7, the second case member 42 has a third cavity 423 formed to collect the lubricating oil thrown up by rotation of the clutch drum 32. The third cavity 423 is formed outside an arc-shaped peripheral wall portion 424 in the second accommodating chamber 4b, and the peripheral wall portion 424 has an inner surface 424a facing the outer peripheral surface of the clutch drum 32. That is, in the second accommodating chamber 4b, a cylindrical accommodating space 40b accommodating the clutch drum 32 is separated from the third cavity 423 by the peripheral wall portion 424. An opening 423a through which the lubricating oil flows into the third cavity 423 is formed in the uppermost part of the second accommodating chamber 4b.

The opening 423a of the third cavity 423 is formed between an upper end 424b of the peripheral wall portion 424 and an opening inner surface 423b. The opening inner surface 423b is formed above the upper end 424b of the peripheral wall portion 424, and is tilted with respect to the direction perpendicular to the rotation axis O (the radial direction of the clutch drum 32) so as to face toward the third cavity 423.

The second flow passage 45 (see FIG. 2) that allows the lubricating oil to flow from the second accommodating chamber 4b into the first accommodating chamber 4a is formed in the lower part of the third cavity 423. An inlet opening 45a of the second flow passage 45 is formed on the side of the second accommodating chamber 4b in the lower part of the third cavity 423 of the second case member 42. A discharge opening 45b (shown in FIG. 2) of the second flow passage 45 is formed on the side of first accommodating chamber 4a of the second case member 42.

The second flow passage 45 allows the lubricating oil thrown up by rotation of the clutch drum 32 when the clutch drum 32 and the intermediate shaft 31 rotate in the opposite direction to the rear drive shaft 107L to flow from the second accommodating chamber 4b into the first accommodating chamber 4a.

Figure 8A:
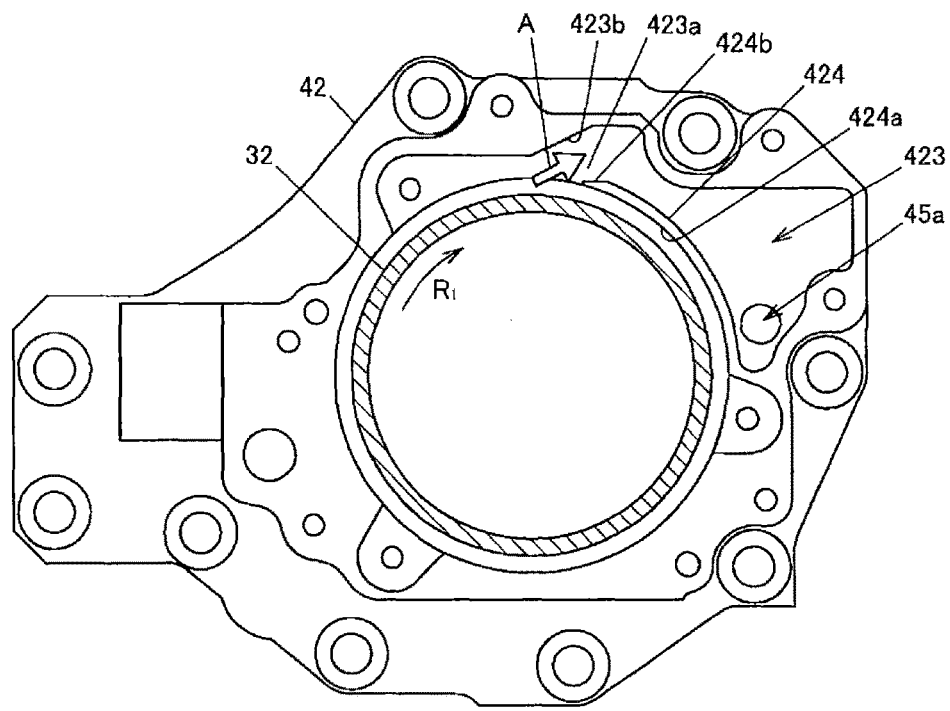
FIG. 8A is an illustration showing the relation between the rotation direction of a clutch drum and the flowing direction of lubricating oil flowing into a third cavity during traveling in a two-wheel drive mode.
Figure 8B:
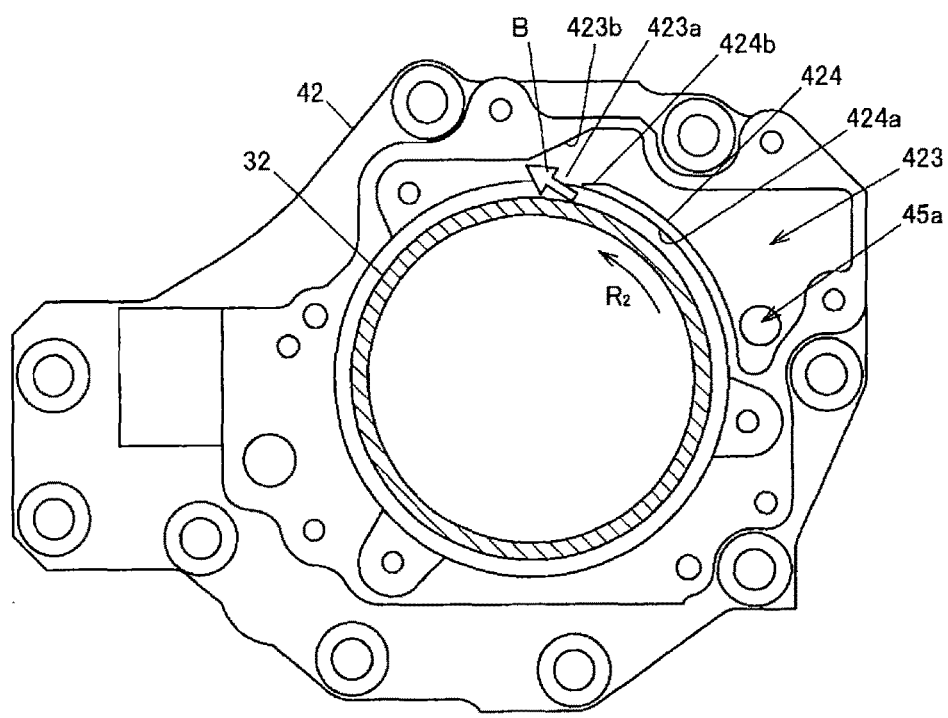
FIG. 8B is an illustration showing the relation between the rotation direction of the clutch drum and the flowing direction of the lubricating oil flowing into the third cavity during traveling in a four-wheel drive mode.

FIG. 8A is an illustration showing the relation between the rotation direction of the clutch drum 32 and the flowing direction of the lubricating oil flowing into the third cavity 423 during traveling in the two-wheel drive mode. FIG. 8B is an illustration showing the relation between the rotation direction of the clutch drum 32 and the flowing direction of the lubricating oil flowing into the third cavity 423 during traveling in the four-wheel drive mode.

As shown in FIG. 8A, during traveling in the two-wheel drive mode, the clutch drum 32 rotates in the direction shown by arrow $R_1$. In this case, the lubricating oil subjected to a centrifugal force due to the rotation of the clutch drum 32 is scattered in the direction tangential to the outer peripheral surface of the clutch drum 32 as shown by arrow A, and a part of this lubricating oil flies into the third cavity 423 through the opening 423a. At this time, the lubricating oil adhering to the opening inner surface 423b is moved toward the inside of the third cavity 423 by the force of the lubricating oil scattered from the clutch drum 32, and is collected by the third cavity 423. That is, the tilt angle of the opening inner surface 423b with respect to the direction perpendicular to the rotation axis O is designed so that the opening inner surface 423b extends in the direction in which the lubricating oil is scattered when the clutch drum 32 rotates in the direction shown by arrow $R_1$.

As shown in FIG. 8B, during traveling in the four-wheel drive mode, the clutch drum 32 rotates in the direction shown by arrow $R_2$. In this case, the lubricating oil subjected to a centrifugal force due to the rotation of the clutch drum 32 is scattered in the direction tangential to the outer peripheral surface of the clutch drum 32 as shown by arrow B. The width of the opening 423a of the third cavity 423 as viewed in this direction is narrower than that of the opening 423a in the case where the clutch drum 32 rotates in the direction shown by arrow $R_1$. The lubricating oil adhering to the opening inner surface 423b is not moved toward the inside of the third cavity 423 by the force of the lubricating oil scattered from the clutch drum 32, but flows downward along the opening inner surface 423b. The lubricating oil adhering to the opening inner surface 423b is therefore not collected by the third cavity 423.

As described above, the amount of lubricating oil that is collected by the third cavity 423 varies depending on the rotation direction of the clutch drum 32. The amount of lubricating oil that is collected by the third cavity 423 is larger when the clutch drum 32 rotates in the direction shown by arrow $R_1$ than when the clutch drum 32 rotates in the direction shown by arrow $R_2$. That is, during traveling in the two-wheel drive mode, the lubricating oil collected by the clutch drum 32 flows into the first accommodating chamber 4a through the second flow passage 45, and the amount of lubricating oil in the second accommodating chamber 4b decreases accordingly. This reduces drag torque due to viscosity of the lubricating oil that is present between the outer and inner clutch plates 341, 342. In the two-wheel drive mode, the friction clutch 34 is not pressed by the pressing mechanism 35. Accordingly, there is no risk of abrasion of the outer clutch plates 341 and the inner clutch plates 342 even if the amount of lubricating oil in the second accommodating chamber 4b decreases.

The third cavity 423 forms a second catch tank 4d that is provided in the second accommodating chamber 4b of the case member 4 so as to communicate with the second flow passage 45, and that collects the lubricating oil in the second accommodating chamber 4b. The opening area of the opening 423a of the second catch tank 4d is larger than the flow passage area of the second flow passage 45. The lubricating oil thrown up by the rotation of the clutch drum 32 in the direction shown by arrow $R_1$ is thus efficiently collected by the second catch tank 4d and supplied to the first accommodating chamber 4a through the second flow passage 45.

If the amount of lubricating oil in the second accommodating chamber 4b becomes larger than a predetermined amount during traveling in the four-wheel drive mode, the lubricating oil flows from the second accommodating chamber 4b into the first accommodating chamber 4a through clearance G (shown in FIG. 3) between the inner surface defining the insertion hole 421a in the wall portion 421 of the second case member 42 and the outer peripheral surface of the intermediate shaft 31 without flowing through the second flow passage 45. This configuration is intended to avoid a situation where the lubricating oil is excessively or unevenly present in the second accommodating chamber 4b and each part of the differential gear 2 fails to be appropriately lubricated. That is, the clearance G between the intermediate shaft 31 and the wall portion 421 of the second case member 42 is a third flow passage that allows the lubricating oil to flow from the second accommodating chamber 4b into the first accommodating chamber 4a when the amount of lubricating oil in the second accommodating chamber 4b becomes larger than the predetermined amount.

Although the needle roller bearing 58 is placed in the clearance G the lubricating oil can flow between a plurality of rollers of the needle roller bearing 58. The lubricating oil that has flown into the first accommodating chamber 4a through the clearance G flows through gaps in the tapered roller bearing 50 supporting the differential case 22 in the case member 4, and lubricates each part of the differential gear 2.

The embodiment described above has the following functions and advantageous effects.

During traveling in the two-wheel drive mode, the lubricating oil flows from the second accommodating chamber 4b into the first accommodating chamber 4a through the second flow passage 45. Accordingly, the amount of lubricating oil in the second accommodating chamber 4b decreases, which reduces drag torque in the friction clutch 34. This improves fuel economy of the four-wheel-drive vehicle 100. During traveling in the four-wheel drive mode, the lubricating oil flows from the first accommodating chamber 4a into the second accommodating chamber 4b through the first flow passage 44. Accordingly, the friction clutch 34 is lubricated by the lubricating oil, which suppresses abrasion of the outer clutch plates 341 and the inner clutch plates 342. That is, the present embodiment can appropriately lubricate the friction clutch 34 in the four-wheel drive mode, and can reduce drag torque in the friction clutch 34 in the two-wheel drive mode, thereby improving fuel economy.

In the two-wheel drive mode, the lubricating oil thrown up by rotation of the clutch drum 32 flows from the second accommodating chamber 4b into the first accommodating chamber 4a through the second flow passage 45. Accordingly, the lubricating oil can be made to flow into the first accommodating chamber 4a by using a simpler configuration than in the case of using, e.g., a pump.

In the four-wheel drive mode, the lubricating oil thrown up by rotation of the ring gear 21 and the differential case 22 flows from the first accommodating chamber 4a into the second accommodating chamber 4b through the first flow passage 44. Accordingly, the lubricating oil can be made to flow into the second accommodating chamber 4b by using a simpler configuration than in the case of using, e.g., a pump.

If the amount of lubricating oil in the second accommodating chamber 4b becomes larger than the predetermined amount during traveling in the four-wheel drive mode, the lubricating oil flows from the second accommodating chamber 4b into the first accommodating chamber 4a through the clearance G between the inner surface defining the insertion hole 421a in the wall portion 421 of the second case member 42 and the outer peripheral surface of the intermediate shaft 31. This can avoid the situation where the lubricating oil is excessively or unevenly present in the second accommodating chamber 4b and the differential gear 2 fails to be appropriately lubricated.

The vehicle driving force distribution device of the invention is described above based on the above embodiment. However, the invention is not limited to the above embodiment, and may be carried out in various forms without departing from the split and scope of the invention. For example, the invention can be modified as follows.

In the above embodiment, the intermediate shaft 31 and the clutch drum 32 are integrally formed as a part of the clutch housing 30. However, the intermediate shaft 31 and the clutch drum 32 may be separate elements, and may be coupled so as not to be rotatable relative to each other.

The pressing mechanism 35 that presses the friction clutch 34 is not limited to the one using the electric motor 6. A mechanism using an electromagnetic clutch and a cam mechanism, a mechanism that presses a friction clutch by a piston that advances and withdraws by an oil pressure, etc. may be used as appropriate.

A through hole may be formed in the wall portion 421 of the second case member 42 so that the lubricating oil can flow from the second accommodating chamber 4b into the first accommodating chamber 4a through the through hole in the case where the amount of lubricating oil in the second accommodating chamber 4b becomes larger than a predetermined amount.

What is claimed is:

1. A vehicle driving force distribution device, comprising:
a differential gear that distributes a driving force received from an input shaft to a first output shaft and an intermediate shaft so as to allow differential motion therebetween;
a driving force transmission device having a function to adjust the driving force that is transmitted from the intermediate shaft to a second output shaft; and
a case member including a first accommodating chamber accommodating the differential gear, and a second accommodating chamber accommodating the driving force transmission device; wherein
the case member has a first flow passage that allows lubricating oil to flow from the first accommodating chamber into the second accommodating chamber, and a second flow passage that allows lubricating oil to flow from the second accommodating chamber into the first accommodating chamber,
when the input shaft does not rotate and the intermediate shaft and the second output shaft rotate in opposite directions, lubricating oil flows from the second accommodating chamber into the first accommodating chamber through the second flow passage,
when the input shaft rotates and the intermediate shaft and the second output shaft rotate in a same direction, lubricating oil flows from the first accommodating chamber into the second accommodating chamber through the first flow passage, and
the case member includes a catch tank that is provided in the second accommodating chamber so as to communicate with the second flow passage, and that collects the lubricating oil in the second accommodating chamber.

2. The vehicle driving force distribution device according to claim 1, wherein
the driving force transmission device includes
a cylindrical clutch drum that rotates together with the intermediate shaft,
an inner shaft whose one end is accommodated in the clutch drum, and to which the second output shaft is coupled so as not to be rotatable relative to the inner shaft, and
a friction clutch that is placed between the clutch drum and the inner shaft, and that couples the clutch drum and the inner shaft so that torque can be transmitted therebetween, and
the second flow passage allows lubricating oil thrown up by rotation of the clutch drum when the intermediate shaft rotates in an opposite direction to the second output shaft to flow from the second accommodating chamber into the first accommodating chamber.

3. The vehicle driving force distribution device according to claim 1, wherein
the differential gear includes a differential case having placed around its outer periphery a ring gear that meshes with a pinion gear provided on the input shaft, and a differential gear mechanism accommodated in the differential case, and
the first flow passage allows lubricating oil thrown up by rotation of the ring gear and the differential case to flow from the first accommodating chamber into the second accommodating chamber.

4. A vehicle driving force distribution device, comprising:
a differential gear that distributes a driving force received from an input shaft to a first output shaft and an intermediate shaft so as to allow differential motion therebetween;
a driving force transmission device having a function to adjust the driving force that is transmitted from the intermediate shaft to a second output shaft; and
a case member including a first accommodating chamber accommodating the differential gear, and a second accommodating chamber accommodating the driving force transmission device; wherein
the case member has a first flow passage that allows lubricating oil to flow from the first accommodating chamber into the second accommodating chamber, and a second flow passage that allows lubricating oil to flow from the second accommodating chamber into the first accommodating chamber, when the input shaft does not rotate and the intermediate shaft and the second output shaft rotate in opposite directions, lubricating oil flows from the second accommodating chamber into the first accommodating chamber through the second flow passage, when the input shaft rotates and the intermediate shaft and the second output shaft rotate in a same direction, lubricating oil flows from the first accommodating chamber into the second accommodating chamber through the first flow passage, and the case member includes
- a first catch tank that is provided in the first accommodating chamber so as to communicate with the first flow passage, and that collects the lubricating oil in the first accommodating chamber, and
- a second catch tank that is provided in the second accommodating chamber so as to communicate with the second flow passage, and that collects the lubricating oil in the second accommodating chamber.

5. A vehicle driving force distribution device, comprising:
a differential gear that distributes a driving force received from an input shaft to a first output shaft and an intermediate shaft so as to allow differential motion therebetween;
a driving force transmission device having a function to adjust the driving force that is transmitted from the intermediate shaft to a second output shaft; and
a case member including a first accommodating chamber accommodating the differential gear, and a second accommodating chamber accommodating the driving force transmission device; wherein
the case member has a first flow passage that allows lubricating oil to flow from the first accommodating chamber into the second accommodating chamber, and
a second flow passage that allows lubricating oil to flow from the second accommodating chamber into the first accommodating chamber, when the input shaft does not rotate and the intermediate shaft and the second output shaft rotate in opposite directions, lubricating oil flows from the second accommodating chamber into the first accommodating chamber through the second flow passage, when the input shaft rotates and the intermediate shaft and the second output shaft rotate in a same direction, lubricating oil flows from the first accommodating chamber into the second accommodating chamber through the first flow passage, and the case member has a third flow passage that allows lubricating oil to flow from the second accommodating chamber into the first accommodating chamber when the amount of lubricating oil in the second accommodating chamber becomes larger than a predetermined amount.

6. The vehicle driving force distribution device according to claim 1, wherein
the vehicle driving force distribution device is mounted on a four-wheel-drive vehicle including a pair of main drive wheels to which a driving force of a driving source is constantly transmitted, and a pair of auxiliary drive wheels to which the driving force of the driving source is transmitted via an engagement/disengagement mechanism capable of cutting off transmission of the driving force and a propeller shaft as the input shaft,
the differential gear distributes the driving force received from the input shaft to a drive shaft as the first output shaft coupled to one of the pair of auxiliary drive wheels and the intermediate shaft, and
the driving force transmission device adjusts the driving force that is transmitted from the intermediate shaft to a drive shaft as the second output shaft coupled to the other auxiliary drive wheel.

\* \* \* \* \*